United States Patent
Chang et al.

(10) Patent No.: US 8,673,171 B2
(45) Date of Patent: Mar. 18, 2014

(54) CATHODE FOR SECONDARY BATTERY

(75) Inventors: Sung-Kyun Chang, Daejeon (KR);
Jinhyung Lim, Daejeon (KR);
DongHun Lee, Seoul (KR); Hong Kyu Park, Daejeon (KR); Su-Min Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/546,023

(22) Filed: Jul. 11, 2012

(65) Prior Publication Data

US 2013/0119325 A1    May 16, 2013

Related U.S. Application Data

(63) Continuation of application No. PCT/KR2011/003063, filed on Apr. 27, 2011.

(30) Foreign Application Priority Data

Apr. 30, 2010 (KR) .................. 10-2010-0041030

(51) Int. Cl.
*H01M 4/88* (2006.01)

(52) U.S. Cl.
USPC ....... 252/182.1; 252/519.1; 427/58; 429/221; 429/223

(58) Field of Classification Search
USPC ........ 252/182.1, 519.1; 427/58; 429/223, 221
See application file for complete search history.

(56) References Cited

U.S. PATENT DOCUMENTS

| | | | |
|---|---|---|---|
| 2008/0131781 A1 | 6/2008 | Yong et al. | |
| 2008/0254368 A1* | 10/2008 | Ooyama et al. | 429/223 |
| 2008/0311479 A1 | 12/2008 | Lee et al. | |
| 2012/0003540 A1* | 1/2012 | Nakano et al. | 429/221 |

FOREIGN PATENT DOCUMENTS

| JP | 11-345615 A | 12/1999 |
|---|---|---|
| KR | 10-2006-0050508 A | 5/2006 |
| KR | 10-2007-0060023 A | 6/2007 |
| KR | 10-2009-0105868 A | 10/2009 |

OTHER PUBLICATIONS

International Search Report issued in PCT/KR2011/003063, mailed on Jan. 17, 2012.

* cited by examiner

*Primary Examiner* — Khanh Tuan Nguyen
(74) *Attorney, Agent, or Firm* — Birch, Stewart, Kolasch & Birch, LLP

(57) ABSTRACT

Disclosed is a cathode for secondary batteries comprising a compound having a transition metal layer containing lithium as at least one compound selected from the following formula 1: $(1-x)Li(Li_yM_{1-y-z}Ma_z)O_{2-b}A_b \cdot xLi_3PO_4$ (1) wherein M is an element stable for a six-coordination structure, which is at least one selected from transition metals that belong to first and second period elements; Ma is a metal or non-metal element stable for a six-coordination structure; A is at least one selected from the group consisting of halogen, sulfur, chalcogenide compounds and nitrogen; $0<x<0.1$; $0<y<0.3$; $0 \leq z<0.2$; and $0 \leq b<0.1$.

5 Claims, 1 Drawing Sheet

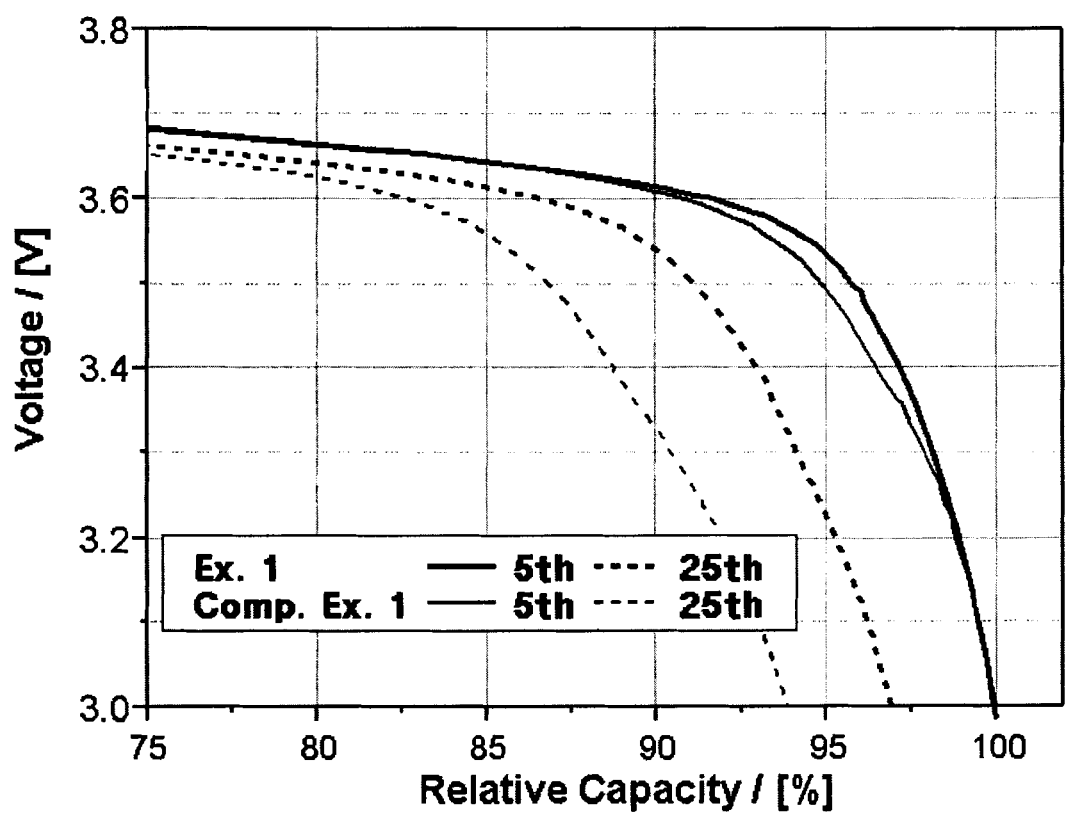

CATHODE FOR SECONDARY BATTERY

CROSS REFERENCE TO RELATED APPLICATIONS

This application is a Continuation of PCT International Application No. PCT/KR2011/003063 filed on Apr. 27, 2011, which claims priority under 35 U.S.C. §119(a) to Patent Application No. 10-2010-0041030 filed in the Republic of Korea on Apr. 30, 2010, all of which are hereby expressly incorporated by reference into the present application.

TECHNICAL FIELD

The present invention relates to a cathode for secondary batteries. More specifically, the present invention relates to a cathode for secondary batteries having long lifespan and superior storage properties and exerting superior safety based on a specific element composition.

BACKGROUND ART

Technological development and increased demand for mobile equipment have led to a rapid increase in the demand for secondary batteries as energy sources. Among these secondary batteries, lithium secondary batteries having high energy density and voltage, long lifespan and low self-discharge are commercially available and widely used.

In addition, increased interest in environmental issues has brought about a great deal of research associated with electric vehicles (EVs) and hybrid electric vehicles (HEVs) as substitutes for vehicles using fossil fuels such as gasoline vehicles and diesel vehicles which are main factors of air pollution. These electric vehicles generally use nickel hydride metal (Ni-MH) secondary batteries as power sources of with electric vehicles (EVs), hybrid electric vehicles (HEVs) and the like. However, a great deal of study associated with use of lithium secondary batteries with high energy density and discharge voltage is currently underway and some of them are commercially available.

In particular, lithium secondary batteries used for electric vehicles should have high energy density, exhibit great power within a short time and be used under harsh conditions for 10 years or longer, thus requiring considerably superior stability and long lifespan, as compared to conventional small lithium secondary batteries.

Conventional lithium secondary batteries generally utilize a lithium cobalt composite oxide having a layered structure for a cathode and a graphite-based material for an anode. However, such lithium cobalt composite oxide is disadvantageously unsuitable for electric vehicles in terms of presence of extremely expensive cobalt as a main element and low safety. Accordingly, lithium manganese composite oxide having a spinel structure containing manganese that is cheap and has superior safety is suitable for use as a cathode of lithium ion secondary batteries for electric vehicles.

However, lithium manganese composite oxides cause deterioration in battery properties since manganese is released into an electrolyte due to affection of the electrolyte when stored at high temperature. Accordingly, there is a need for a solution to this phenomenon. In addition, as compared to conventional lithium cobalt composite oxide or lithium nickel composite oxide, lithium manganese composite oxides have a disadvantage of low capacity per unit weight, thus having a limitation of an increase in capacity per battery weight. Lithium manganese composite oxide should be used in combination with battery design capable of solving this phenomenon in order to allow the same to be practically available as a power source of electric vehicles.

In order to solve these disadvantages, layered mixed metal oxides, $LiNi_xMn_yCo_zO_2$ (x+y+z=1) and the like are used, but they cannot secure satisfactory stability yet. Surface-treatment is attempted in order to solve this disadvantage, but problems such as increase in price which is one of the most important problems in the battery market such as electric vehicles occur due to the necessity of additional processes.

DISCLOSURE

Technical Problem

Therefore, the present invention has been made to solve the above problems and other technical problems that have yet to be resolved.

As a result of a variety of extensive and intensive studies and experiments to solve the problems, as described below, the inventors of the present invention have discovered that, when a secondary battery is fabricated using a cathode comprising a cathode active material that has a specific element composition as shown in the compound of Formula 1 and includes a transition metal layer containing lithium, lifespan can be greatly improved without using additional processes. Based on this discovery, the present invention has been completed.

Technical Solution

In accordance with one aspect of the present invention, provided is a cathode for secondary batteries, comprising a compound having a transition metal layer containing lithium as at least one compound selected from the following formula 1:

$$(1-x)Li(Li_yM_{1-y-z}Ma_z)O_{2-b}A_b * xLi_3PO_4 \quad (1)$$

wherein M is an element stable for a six-coordination structure, which is at least one selected from transition metals that belong to first and second period elements;

Ma is a metal or non-metal element stable for a six-coordination structure;

A is at least one selected from the group consisting of halogen, sulfur, chalcogenide compounds and nitrogen;

$0 < x < 0.1$;

$0 < y < 0.3$;

$0 \leq z < 0.2$;

and $0 \leq b < 0.1$.

The cathode according to the present invention realizes stabilization of crystal structure caused by variation in oxidation number by Li (lithium) present in the transition metal layer based on the aforementioned specific composition and exhibits improved cycle properties and storage properties of an active material, since $Li_3PO_4$ having a strong bonding force and ion conductivity is present on the surface of active material particles or inside the same.

When the content of $Li_3PO_4$ is excessively high, it inhibits crystallization of the cathode active material and it may be difficult to improve performance of the active material. As defined above, the content of $Li_3PO_4$ is preferably lower than 0.1, more preferably $0 < x \leq 0.05$.

In addition, when the content of Li in the transition metal layer is excessively high, deterioration in capacity may be caused. Accordingly, the defined content range is preferred and 0.01≤y≤0.2 is more preferred.

M of Formula 1 is a transition metal that satisfies the aforementioned conditions and may be one or more selected from Ni, Mn, Co, Cr, Fe, V, Zr and the like and the cathode active material preferably contains Ni and Mn as essential elements and contains Co as an optional element. In this case, the contents of Ni, Mn and Co satisfy the equation of the following formula 2.

$$M = Ni_a Mn_b Co_c \qquad (2)$$

wherein 0.10<a<0.85, 0.10<b<0.85, and 0≤c<0.5.

As defined above, the transition metal (M) may be substituted at an amount defined by A of Formula 1 by a metal or non-metal element having a six-coordination structure such as Al, Mg or B.

In addition, oxygen (O) may be also substituted at an amount defined in Formula 1 by other anions, for example, halogen elements such as F, Cl, Br and I, sulfur, chalcogenide compounds, nitrogen and the like.

The compound of Formula 1 may be prepared by a method well-known in the art, based on the composition of the formula.

The cathode active material may be for example prepared by preparing a mixed transition metal precursor by a variety of methods such as co-precipitation, adding a lithium compound such as lithium hydroxide and lithium carbonate and lithium phosphate thereto and baking the resulting compound.

The cathode may contain a general lithium transition metal oxide that does not satisfy the aforementioned conditions, as a cathode active material, in addition to the compound of Formula 1. The general lithium transition metal oxide includes oxides containing one of Ni, Co and Mn and oxides containing two or more thereof and examples thereof include lithium transition metal oxides known in the art. In this case, the compound of Formula 1 may be present in an amount of at least 30% by weight or higher, preferably, 50% by weight or higher, based on the total amount of the active material.

The cathode may be prepared by mixing a cathode mix comprising the cathode active material, a conductive material and a binder, with a predetermined solvent such as water or NMP to prepare a slurry, and applying the slurry to a cathode current collector, followed by drying and pressing.

The cathode mix may optionally contain at least one selected from the group consisting of a viscosity controller and a filler.

The cathode current collector is generally fabricated to have a thickness of 3 to 500 μm. There is no particular limit as to the cathode current collector, so long as it has suitable conductivity without causing adverse chemical changes in the fabricated battery. Examples of the cathode current collector include stainless steel, aluminum, nickel, titanium, sintered carbon, and aluminum or stainless steel which has been surface-treated with carbon, nickel, titanium or silver. If necessary, these current collectors may also be processed to form fine irregularities on the surface thereof so as to enhance adhesive strength to the cathode active materials. In addition, the current collectors may be used in various forms including films, sheets, foils, nets, porous structures, foams and non-woven fabrics.

The conductive material is commonly added in an amount of 0.01 to 30% by weight, based on the total weight of the mixture comprising the cathode active material. Any conductive material may be used without particular limitation so long as it has suitable conductivity without causing adverse chemical changes in the battery. Examples of conductive materials include conductive materials, including graphite; carbon black such as carbon black, acetylene black, Ketjen black, channel black, furnace black, lamp black and thermal black; conductive fibers such as carbon fiber and metallic fibers; metallic powders such as carbon fluoride powders, aluminum powders and nickel powders; conductive whiskers such as zinc oxide and potassium titanate; conductive metal oxides such as titanium oxide; and polyphenylene derivatives.

The binder is a component which enhances binding of an electrode active material to a conductive material and current collector. The binder is commonly added in an amount of 1 to 30% by weight, based on the total weight of the mixture comprising the cathode active material. Examples of the binder include polyvinylidene, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymer (EPDM), sulfonated EPDM, styrene butadiene rubbers, fluororubbers and various copolymers.

The viscosity controller controls the viscosity of the electrode mix so as to facilitate mixing of the electrode mix and application thereof to the current collector and may be added in an amount of 30% by weight, based on the total weight of the electrode mix. Examples of the viscosity controller include, but are not limited to, carboxymethylcellulose, polyacrylic acid and polyvinylidene fluoride. If necessary, the solvent may also serve as a viscosity controller.

The filler is a component optionally used to inhibit expansion of the electrode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

The present invention provides a lithium secondary battery comprising the cathode, the anode, a separator, and a lithium salt-containing non-aqueous electrolyte.

For example, the anode is prepared by applying an anode mix comprising an anode active material to an anode current collector, followed by drying. The anode mix may comprise the afore-mentioned components, i.e., the conductive material, the binder and the filler, if necessary.

The anode current collector is generally fabricated to have a thickness of 3 to 500 μm. There is no particular limit as to the anode current collector, so long as it has suitable conductivity without causing adverse chemical changes in the fabricated battery. Examples of the anode current collector include copper, stainless steel, aluminum, nickel, titanium, sintered carbon, and copper or stainless steel which has been surface-treated with carbon, nickel, titanium or silver, and aluminum-cadmium alloys. Similar to the cathode current collector, if necessary, these current collectors may also be processed to form fine irregularities on the surface thereof so as to enhance adhesive strength to the anode active materials. In addition, the current collectors may be used in various forms including films, sheets, foils, nets, porous structures, foams and non-woven fabrics.

Examples of the anode active material include carbon and graphite materials such as natural graphite, artificial graphite, expanded graphite, carbon fiber, hard carbon, carbon black, carbon nanotubes, perylene, activated carbon; metals alloyable with lithium, such as Al, Si, Sn, Ag, Bi, Mg, Zn, In, Ge, Pb, Pd, Pt and Ti and compounds containing these elements; composites of carbon and graphite materials with a metal and a compound thereof; and lithium-containing nitrides. Of these, a carbon-based active material, a silicon-based active material, a tin-based active material, or a silicon-carbon-based active material is more preferred. The material may be used alone or in combination of two or more thereof.

The separator is interposed between the cathode and anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a non-aqueous electrolyte, solid electrolyte and inorganic solid electrolyte may be utilized.

Examples of the non-aqueous electrolyte that can be used in the present invention include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte utilized in the present invention include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further contain halogen-containing solvents such as carbon tetrachloride and ethylene trifluoride. Further, in order to improve high-temperature storage characteristics, the non-aqueous electrolyte may further contain carbon dioxide gas or the like and may further contain fluoro-ethylene carbonate (FEC), propene sulfone (PRS), fluoro-propylene carbonate (FPC) and the like.

The lithium secondary batteries according to the present invention may be used as unit batteries of battery modules, which are power sources of medium and large devices requiring high-temperature stability, long cycle and superior rate characteristics.

Preferably, examples of medium and large devices include power tools powered by battery-driven motors; electric vehicles including electric vehicles (EVs), hybrid electric vehicles (HEVs) and plug-in hybrid electric vehicles (PHEVs); electric two-wheeled vehicles including electric bikes (E-bikes), electric scooters (E-scooter); electric golf carts and the like.

Accordingly, the present invention provides a middle or large battery pack comprising the secondary battery as a unit battery. The general structure and production method of the middle or large battery pack are known in the art and a detailed explanation thereof is omitted herein.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a graph showing discharge profiles at $5^{th}$ and $25^{th}$ cycles for the battery of Example 1 and the battery of Comparative Example 1 in the Experimental Example 2.

BEST MODE

Now, the present invention will be described in more detail with reference to the following examples. These examples are provided only to illustrate the present invention and should not be construed as limiting the scope and spirit of the present invention.

Example 1

A mixed transition metal precursor having a composition of Ni:Mn:Co=0.53:0.27:0.2 (molar ratio) was prepared by a co-precipitation method known in the art, and lithium hydroxide and $Li_3PO_4$ were added to the mixed transition metal precursor such that conditions of x=0.01, y=0.02, z=0.0 and b=0 in Formula 1 were satisfied, followed by baking in a furnace to synthesize a cathode active material.

The synthesized cathode active material was mixed with NMP such that a ratio of active material:conductive material: binder became 95:2.5:2.5 (weight ratio), and the mixture was coated on an Al foil with a thickness of 20 μm to produce a cathode. The cathode was pressed such that an inner pore ratio was 25% to fabricate a coin-type battery. A Li-metal foil was used as an anode and a solution of 1M $LiPF_6$ in a carbonate mixed solvent (EC:DMC:DEC=1:2:1, volume ratio) was used as an electrolyte.

Example 2

A battery was fabricated in the same manner as in Example 1 except that a cathode active material having a composition of x=0.03 was synthesized.

Comparative Example 1

A battery was fabricated in the same manner as in Example 1 except that a cathode active material having a composition of x=0 was synthesized.

Example 3

A battery was fabricated in the same manner as in Example 1 except that a cathode active material having a composition of x=0.05 was synthesized.

Example 4

A battery was fabricated in the same manner as in Example 1 except that a cathode active material having a composition of x=0.005 was synthesized.

Example 5

A battery was fabricated in the same manner as in Example 1 except that a cathode active material was synthesized by adding aluminum hydroxide such that a part (z=0.02) of the transition metal was substituted by Al, followed by baking.

Comparative Example 2

A battery was fabricated in the same manner as in Example 1 except that a cathode active material having a composition of x=0 was synthesized, and mixed with NMP such that active material: lithium phosphate: conductive material: binder was 90:5:2.5:2.5 (weight ratio), and the cathode active material was coated on an Al foil with a thickness of 20 μm to fabricate a cathode.

Experimental Example 1

The batteries fabricated in Examples 1 to 4 and Comparative Examples 1 and 2 were charged and discharged at 0.1 C, capacities thereof were measured, and deterioration in capacity with cycles was measured under charge and discharge conditions of 0.5 C. The results thus obtained are shown in the following Table 1.

TABLE 1

|  | Discharge capacity (mAh/g) | $30^{th}$ cycle capacity/$1^{st}$ cycle capacity (%) |
|---|---|---|
| Ex. 1 | 166 | 97.4 |
| Comp. Ex. 1 | 165 | 93.0 |
| Ex. 2 | 166 | 97.8 |
| Ex. 3 | 160 | 98.2 |
| Ex. 4 | 168 | 97.3 |
| Ex. 5 | 165 | 97.5 |
| Comp. Ex. 2 | 153 | 78 |

As can be seen from Table 1 above, although the batteries of Examples 1 to 4 contained $Li_3PO_4$ not directly contributing to charge and discharge, they did not exhibit a great difference in initial capacity. As the content of $Li_3PO_4$ increased, the capacity thereof slightly decreased, but was not significant.

On the other hand, the batteries (Examples 1 to 5) using a cathode active material containing $Li_3PO_4$ exhibited a considerably low capacity deterioration with an increase in cycles, as compared to the batteries (Comparative Examples 1 to 2) using a cathode active material containing no $Li_3PO_4$. Specifically, for the $30^{th}$ cycle capacity to the $1^{st}$ cycle capacity, the batteries of Examples 1 to 5 exhibited at least 4% or higher capacity, as compared to the battery of Comparative Example 1. This difference reached several tens of % at 300 cycles or more, and as described above, batteries for vehicles are charged 1000 cycles or more and under these conditions, the difference increased.

Furthermore, the battery of Comparative Example 2 exhibited 15% or more lower cycle properties, as compared to the batteries of Examples 1 to 5. This is due to the fact that battery capacity is decreased, cycle characteristics are rapidly deteriorated and electrical conductivity was lowered by separately adding $Li_3PO_4$ to the cathode active material. The battery of Comparative Example 2 was greatly distinguished with batteries of Examples 1 to 5 fabricated using a cathode active material synthesized by mixing other precursors with $Li_3PO_4$, followed by baking.

Experimental Example 2

The batteries fabricated in Example 1 and Comparative Example 1 were charged and discharged 5 and 25 cycles at 0.5 C, and discharge profiles at these cycles are shown in FIG. 1.

As can be seen from FIG. 1, the battery of Example 1 exhibited deterioration at the end stage of discharge, and in particular, a remarkable decrease in voltage drop, as compared to the battery of Comparative Example 1. This means that deterioration is decreased due to structural change of the cathode. Such deterioration at the end stage of discharge is the most important factor that rapidly deteriorates the power of batteries for electric vehicles or hybrid electric vehicles and the factor is more important than a decreased capacity that can be measured in general batteries.

In this regard, the cathode active material of the present invention can considerably reduce deterioration at the end stage of discharge. As can be seen from FIG. 1, such a phenomenon becomes serious, as the number of cycles increases. That is, the deterioration difference at the end stage of discharge at the $25^{th}$ cycle is greater than that at the $5^{th}$ cycle.

Batteries for vehicles require 3600 cycles or more of charge and discharge although they are charged and discharged only once a day under product guarantee conditions of 10 years or longer, thus making this difference considerably great. Accordingly, small difference in small conventional batteries further increases in batteries for vehicles, and difference in cycle properties, variation in charge and discharge profiles and the like are more important than the small difference in capacity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the afore-going, the cathode according to the present invention can improve lifespan properties based on a specific element composition, and in particular, is thus preferably useful for devices requiring use for a long period of time due to superior cycle properties.

The invention claimed is:

1. A cathode for secondary batteries comprising a compound having a transition metal layer containing lithium as at least one compound selected from the following formula 1:

$$(1-x)Li(Li_yM_{1-y-z}Ma_z)O_{2-b}A_b*xLi_3PO_4 \qquad \text{formula (1)}$$

wherein M has a composition of the following formula 2:

$$Ni_aMn_bCo_c \qquad \text{formula (2)},$$

Ma is a metal or non-metal element stable for a six-coordination structure;

A is at least one selected from the group consisting of halogen, sulfur, chalcogenide compounds and nitrogen;

$0<x<0.1$;

$0<y<0.3$;

$0 \le z<0.2$;

$0 \le b<0.1$;

$0.10<a<0.85$;

$0.10<b<0.85$;

$0<c<0.5$;

and $b>c$.

2. The cathode for secondary batteries according to claim 1, wherein x satisfies the condition of $0<x \le 0.05$.

3. The cathode for secondary batteries according to claim 1, wherein y satisfies the condition of $0.01 \le y \le 0.2$.

4. A lithium secondary battery comprising the cathode according to claim 1.

5. A middle or large battery pack comprising the lithium secondary battery according to claim 4 as a unit battery.

* * * * *